(12) United States Patent
Sugai

(10) Patent No.: US 7,596,467 B2
(45) Date of Patent: Sep. 29, 2009

(54) PEDOMETER THAT AVOIDS STEP-COUNTING ERRORS WHEN SWITCHING BETWEEN DIFFERENT DISPLAY MODES

(75) Inventor: Yoshinori Sugai, Chiba (JP)

(73) Assignee: Seiko Instruments Inc. (JP)

( * ) Notice: Subject to any disclaimer, the term of this patent is extended or adjusted under 35 U.S.C. 154(b) by 86 days.

(21) Appl. No.: 11/818,291

(22) Filed: Jun. 14, 2007

(65) Prior Publication Data

US 2008/0004834 A1 Jan. 3, 2008

(30) Foreign Application Priority Data

Jun. 20, 2006 (JP) ............... 2006-169772

(51) Int. Cl.
*G01C 22/00* (2006.01)
*G06F 17/40* (2006.01)

(52) U.S. Cl. ............... 702/160; 702/158; 702/187; 377/24.2

(58) Field of Classification Search ............... 702/160, 702/158, 187
See application file for complete search history.

(56) References Cited

U.S. PATENT DOCUMENTS

2001/0007825 A1* 7/2001 Harada et al. ............... 463/7

2005/0232388 A1* 10/2005 Tsuji ............... 377/24.2
2005/0238132 A1* 10/2005 Tsuji ............... 377/24.2

FOREIGN PATENT DOCUMENTS

| JP | 2001 134739 | 5/2001 |
|---|---|---|
| JP | 2005 283340 | 10/2005 |
| JP | 2005 291890 | 10/2005 |

\* cited by examiner

*Primary Examiner*—Hal D Wachsman
(74) *Attorney, Agent, or Firm*—Adams & Wilks

(57) ABSTRACT

A pedometer measures the walk of a person and has an operating portion operated by the person to change the display mode. When operation of the operating portion is detected, a CPU proceeds to a walk determining mode, counts a walk signal from an acceleration sensor to successively store to a walk step number buffer memory, proceeds to a walk step number measuring mode when walking is determined in the walk determining mode, adds the walk step number stored to a walk step number memory, thereafter, continuously measures the walk step number, and adds the walk signal to the walk step number of the walk step number at each time of receiving the walk signal from the acceleration sensor. In this manner, operation of the operating portion to change display modes is not erroneously detected as a walk, thereby improving the measurement accuracy.

12 Claims, 4 Drawing Sheets

PEDOMETER THAT AVOIDS STEP-COUNTING ERRORS WHEN SWITCHING BETWEEN DIFFERENT DISPLAY MODES

BACKGROUND OF THE INVENTION

1. Field of the Invention

The present invention relates to a pedometer for measuring a walk step number by detecting a walk.

2. Description of the Prior Art

In a background art, there is developed a pedometer for measuring a walk step number of a user by being mounted to the body of the arm, the waist or the like of the user, or being used in a state of being contained in a case or bag held by the user or the like.

The pedometer of the background art detects a motion of the user and measures the walk step number by determining that a walk is produced when there is a constant motion in the body.

Generally, there are provided a plurality of display modes as the display mode of the pedometer (for example, walk step number display mode, distance display mode, calorie display mode and the like), and in any of the display modes, in a case in which the pedometer is functioning to carry out a walk step number counting operation while carrying out a selected display, when the display mode is switched by operating an operating portion, there poses a problem that a vibration in inputting a switch command by operating the operating portion is sensed by a walk sensor and erroneously recognized as a walk, and the vibration is erroneously counted as a walk step number although the walk is not carried out.

In a background art, as a method of resolving the problem, there is developed a pedometer in which a walk step number is stopped to be detected for a constant time period from operating an operating portion, and a walk step number produced in the time period of stopping to detect the walk step number is predicted from a walk pitch immediately before operating the operating portion to correct the walk step number during the stop time period (refer to Japanese Patent No. 3493550 [Patent Reference 1] (paragraphs [0026] through [0033], FIG. 6)) . Further, as another method, there is developed a pedometer in which a number of inputting a switch command by operation during the stop time period is counted to carry out a correction (refer to JP-A-2005-291890 [Patent Reference 2] (paragraphs [0071] through [0135], FIG. 8 through FIG. 23)).

However, the invention described in either of Patent References 1, 2 also poses a problem that the walk number cannot accurately be measured since the correction is carried out by providing the time period of stopping to detect the walk step number.

On the other hand, although there is developed a pedometer for determining a state of a walk when a signal from a walk sensor is continuously inputted for a predetermined period of time (refer to JP-A-2005-283340 [Patent Reference 3](paragraphs [0014] through [0041], FIG. 1 through FIG. 4)), a consideration is not given to erroneous detection by operating an operating portion.

SUMMARY OF THE INVENTION

It is an object of the invention to provide a pedometer that accurately measures a walk step number by restraining an erroneous detection by operating an operating portion.

According to the invention, there is provided a pedometer comprising walk detecting means for detecting a walk and outputting a corresponding walk signal, a walk step number counting means for calculating a walk step number based on the walk signal and counting the walk step number based on the walk step number signal continuously by being shifted to a walk step number measuring mode of counting the walk step number based on the walk signal when it is determined to be brought into a walk state in a walk determining mode of determining the walk state or not, and stopping to count the walk step number when it is determined to be brought into a walk stop state in the walk determining mode, displaying means for displaying the walk step number counted by the walk step number counting mean, operating means for carrying out a predetermined operation, and operation detecting means for detecting the operation of the operating means, wherein the walk number counting means shifts to the walk determining mode when it is detected that, the operation means is operated by the operation detecting means, and counts the walk step number continuously by being shifted to the walk number counting mode when it is determined to be brought into the walk state in the walk determining mode.

The walk detecting means detects the walk and outputs the corresponding walk signal. The walk step number counting means counts the walk step number based on the walk signal continuously by being shifted to the walk number measuring mode when it is determined to be brought into the walk state in the walk determining mode and stops counting the walk number when it is determined to be brought into the walk stop state in the walk determining mode. Further, the walk step number counting means shifts to the walk determining mode when it is detected that the operating means is operated by the operation detecting means and counts the walk step number continuously by being shifted to the walk step number counting mode when it is determined to be brought into the walk state in the walk determining mode. The displaying means displays the walk step number counted by the walk step number counting means.

Here, there may be constructed a constitution in which the walk step number counting means determines the walk state when the walk signal is provided continuously for a predetermined time period in the walk determining mode. Further, there may be constructed a constitution further comprising a walk step number buffer memory for successively storing the walk step number counted by the walk step number counting means in the walk determining mode, and a walk step number memory for successively storing the walk step number counted in the walk number measuring mode, wherein the walk step number counting means stores the walk step number counted in the walk determining mode to the walk step number buffer memory and stores the walk step number counted in the walk step number measuring mode to the walk step number memory, and adds the walk step number stored to the walk step number buffer memory to the walk step number stored to the walk step number memory in shifting from the walk determining mode to the walk measuring mode.

Further, there may be constructed a constitution in which the displaying means is provided with a plurality of display modes including a walk step number display mode for displaying the walk step, and switches the display mode in response to the operation of the operating means.

Further, there may be constructed a constitution in which the displaying means displays the walk step number in correspondence with the walk step number stored to the walk step number memory in the walk step number display mode.

According to the pedometer according to the invention, the walk step number can be measured more accurately by restraining erroneous detection by operating the operating portion.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
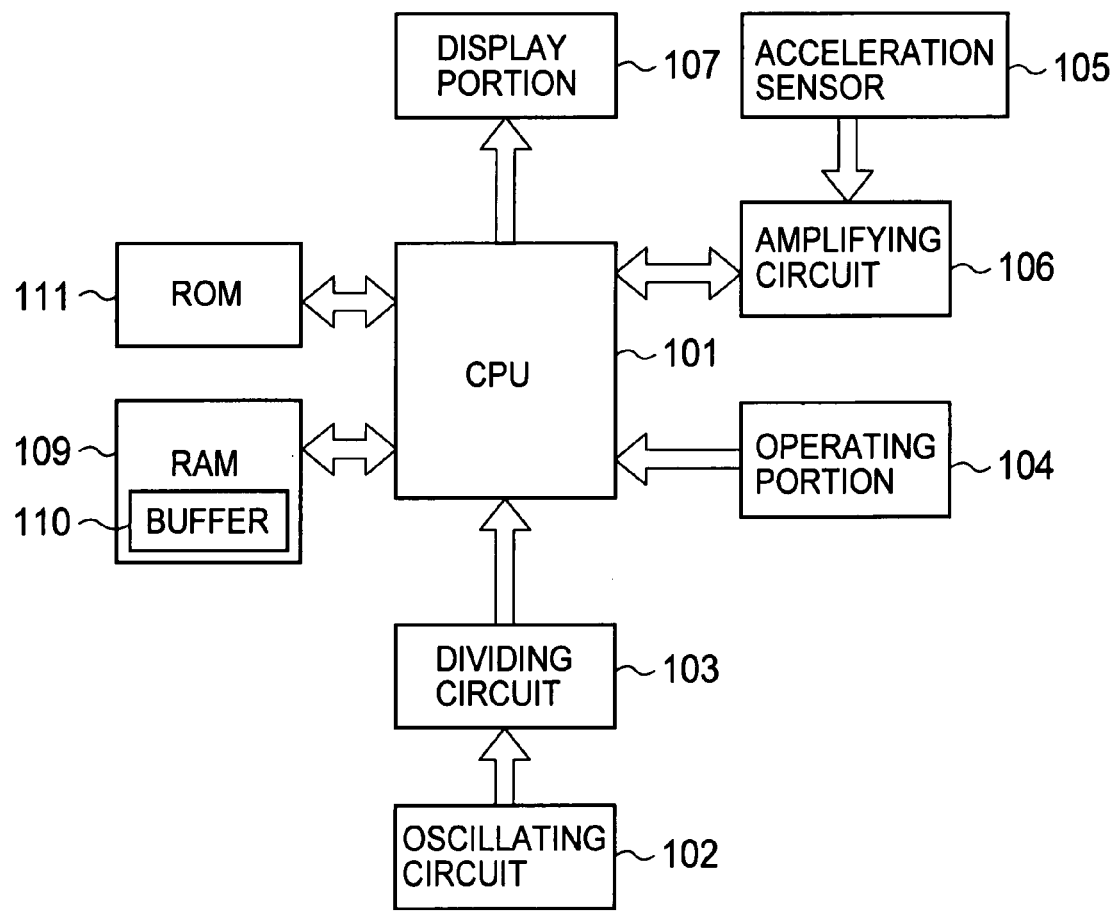
FIG. 1 is a block diagram of a pedometer according to an embodiment of the invention.

FIG. 1 is a block diagram of a pedometer according to an embodiment of the invention, showing an example of a pedometer constituted to be used by being mounted to the arm or the waist or by being held in a state of being contained in a bag or case or the like.

In FIG. 1 the pedometer includes a central processing unit (CPU) 101, an oscillating circuit 102 for outputting a signal of a predetermined frequency, a dividing circuit 103 for dividing an output signal of the oscillating circuit 102 by a predetermined dividing ratio and outputting a reference signal for counting time, an operating portion 104 constituted by a key switch or the like operable by a person using the pedometer from the outside of the pedometer, an acceleration sensor 105 for detecting a walk (including running) of a user and outputting a signal in correspondence with the walk (walk signal), and an amplifying circuit 106 for amplifying to output the walk signal from the acceleration sensor 105.

Further, the pedometer includes a display portion 107 for displaying a walk step number, time or the like, a random access memory (RAM) 109 for storing a measured walk step number data, a set value or the like, a read only memory (ROM) 111 for previously storing a program executed by CPU 101. RAM 109 functions as a walk step number memory for successively storing a measured walk step number, further, RAM 109 is provided with a walk step number buffer memory 110 for temporarily storing a walk step number in a walk determining mode mentioned later.

Here, CPU 101 constitutes walk step number counting means and operation detecting means, the operating portion 104 constitutes operating means, the acceleration sensor 105 constitutes walk detecting means, the display portion 107 constitutes displaying means, RAM 109 and ROM 110 constitute storing means.

Figure 2:
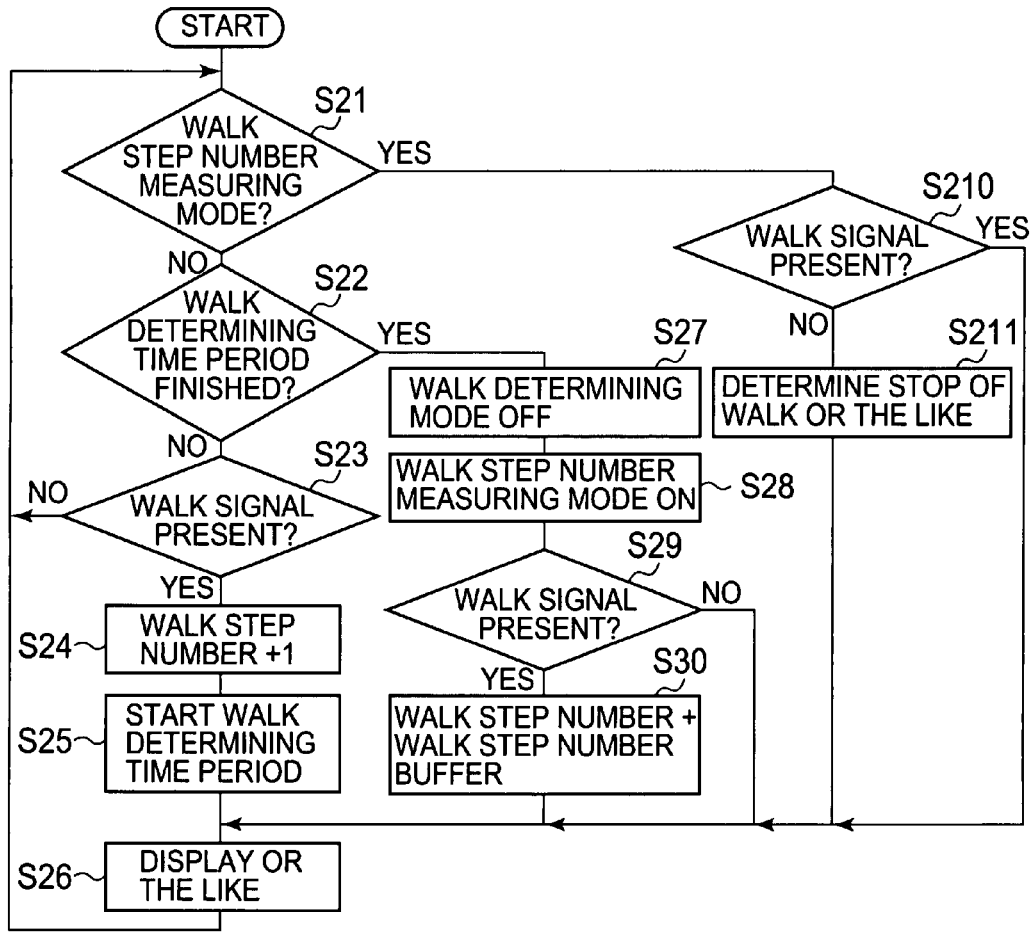
FIG. 2 is a flowchart showing a processing of the pedometer according to the embodiment of the invention.

FIG. 2 is a flowchart showing walk step number measuring processing in normal time of the pedometer according to the embodiment of the invention, showing a processing carried out by executing a program stored to ROM 111 by CPU 101.

Figure 3:
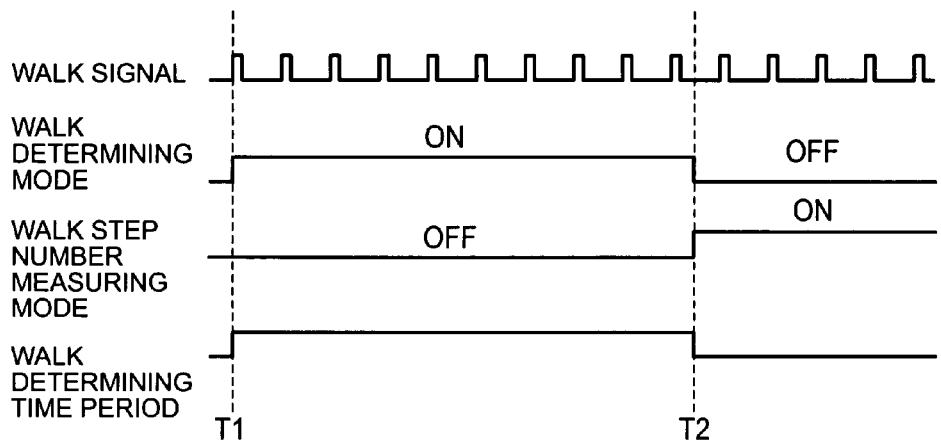
FIG. 3 is a timing chart of the pedometer according to the embodiment of the invention.

Further, FIG. 3 is a timing chart of the walk step number measuring processing in normal time according to the embodiment.

An explanation will be given of the walk step number measuring processing in normal time with regard to the pedometer according to the embodiment in reference to FIG. 1 through FIG. 3 as follows.

Explaining an outline of a walk step number measuring operation of the pedometer according to the embodiment, the walk step number measuring processing in normal time is constituted by a walk determining mode for calculating a walk step number based on a walk signal from the acceleration sensor 105 and determining a walk state or not (time T1 through T2 in FIG. 3), and a walk step number measuring mode for counting the walk step number of a user based on the walk signal (after time T2 in FIG. 3).

In the walk determining mode, CPU 101 determines walking or not based on the walk signal received from the acceleration sensor 105 by way of the amplifying circuit 106 during a walk determining time period (T1 through T2) having a predetermined length. Further, CPU 101 counts the walk signal received from the acceleration sensor 105 during the walk determining time period to store to the walk step number buffer memory 110.

On the other hand, in the walk step number measuring mode, CPU 101 adds the walk signal to the walk step number stored to the walk step number memory 109 at each time of receiving the walk signal from the acceleration sensor 105 by way of the amplifying circuit 106 to count an accumulated walk step number of the user. Immediately after shifting from the walk determining mode to the walk step number measuring mode, CPU 101 reads a walk step number data counted during the walk determining time period from the walk step number buffer memory 110 to add to the walk step number stored to the walk step number memory 109, adds the walk step number signal to the walk step number data stored to the walk step number memory 109 at each time of receiving the walk step number signal from the walk sensor 105 to calculate the accumulated walk step number. The walk step number is measured as described above.

Next, explaining an operation of the pedometer according to the embodiment in, detail first, the user mounts the pedometer at the arm or the like and starts a walk step number measuring operation.

As shown by FIG. 3, at each time of detecting the walk of the user, the acceleration sensor 105 outputs the corresponding walk signal.

CPU 101 determines whether the operation is in the walk step number measuring mode of measuring the walk step number of the user (step S21), confirms whether the walk signal is received from the acceleration sensor 105 by way of the amplifying circuit 106 when it is determined to be brought into the walk step number measuring mode (step S210), determines that the user is brought into the walk stop state when it is determined that the walk signal is not present (step S211), and displays current time or the like at the display portion 107 when it is determined that the walk signal is not received (step S26).

When it is determined not to be brought into the walk step number measuring mode at the processing step S21, CPU 101 confirms whether the walk determining time period has been finished (step S22), stops the walk determining mode when the time period has been finished (step S27), and shifts to the walk step number measuring mode (step S28).

Next, CPU 101 confirms the walk signal from the acceleration sensor 105 (step S29), adds the walk step number during the walk determining time period (walk step number stored to the walk step number buffer memory 110) to the current walk step number (walk step number stored to the walk step number memory 109) when there is a walk signal (step S30), and displays the walk step number at the display portion 107 or carries out other processing (for example, calorie calculation, distance calculation or the like) (step S26). Further, the walk step number data of the walk step number buffer memory 110 is cleared at a time point of the processing step S30.

CPU 101 confirms the walk signal from the acceleration sensor 105 when it is determined that the walk determining time period has not been finished (that is, the operation is in the walk determining mode) at the processing step S22, adds 1 to the walk step number stored to the walk step number buffer memory 110 when there is the walk signal (step S24), starts the walk determining time period (step S25), thereafter, proceeds to the processing step S26. However, when the walk determining time period has already been started, a processing of a start processing or the like is not carried out at all at the processing step S25. By repeating the processings, the walk step number is measured in normal time. Further, the processing steps S21 through S30, S210, S211 in CPU 101 constitute walk step number counting means.

CPU 101 calculates a distance walked by the user and consumed calories based on the measured walk step number. The user can confirm the walk step number, distance, and the consumed calories by switching to display any of a plurality of display modes of the display portion 107 (for example, a walk step number display mode for displaying the walk step number, a distance display mode for displaying the distance walked by the user, a calorie display mode for displaying calories consumed by the user) by operating the operating portion 104.

Next, an explanation will be given of a processing for preventing a vibration generated by operating the operating portion 104 from being erroneously detected as the walk (erroneous detection preventing processing).

Figure 4:
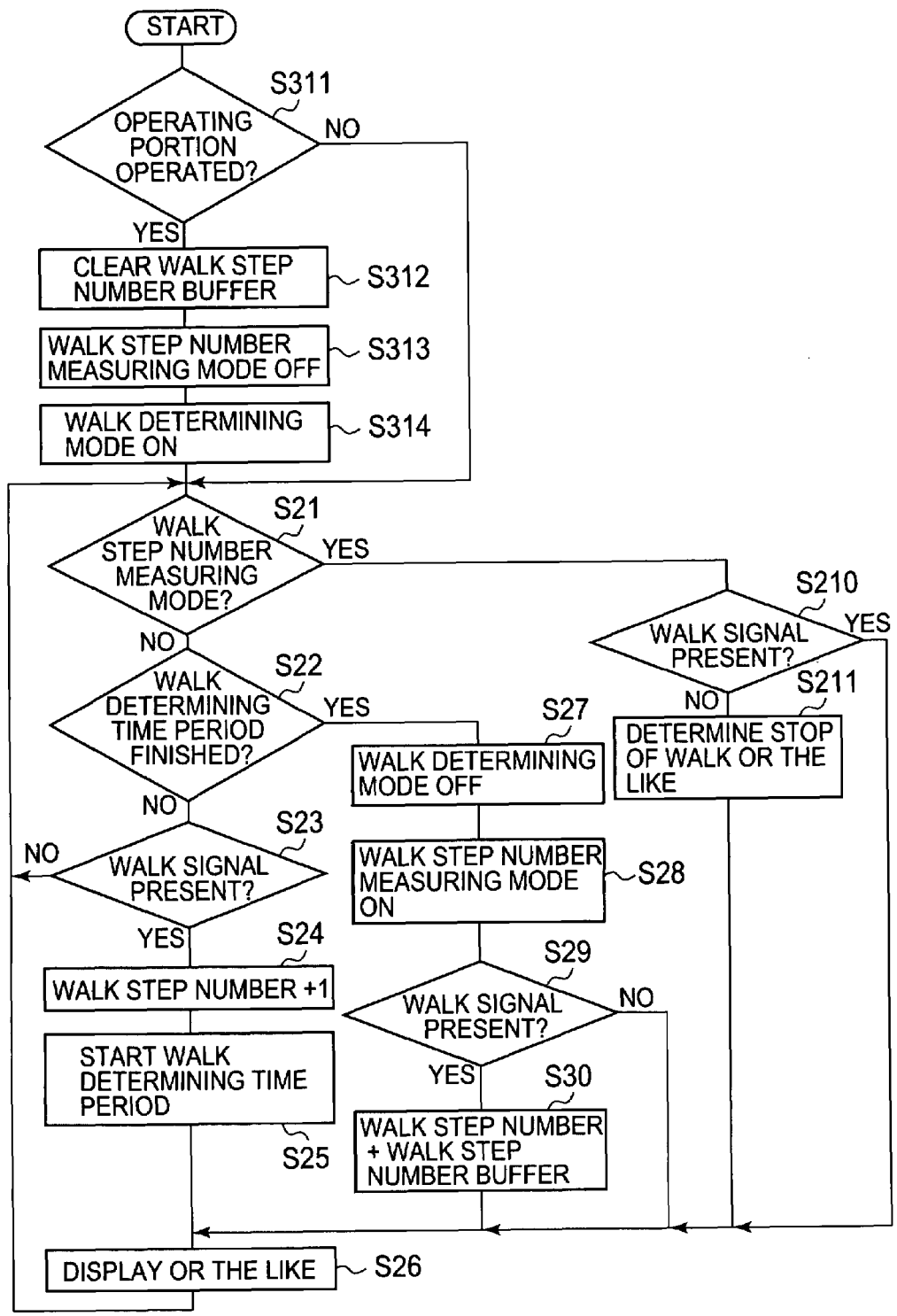
FIG. 4 is a flowchart showing a processing of the pedometer according to the embodiment of the invention.

FIG. 4 is a flowchart of a walk step number measuring processing including an erroneous detection preventing processing in the pedometer according to the embodiment of the invention, showing a processing carried out by executing the program stored to ROM 111 by CPU 101. Further, processings having contents the same as those of FIG. 2 are attached with the same notations, and the following explanation will be omitted.

Figure 5:
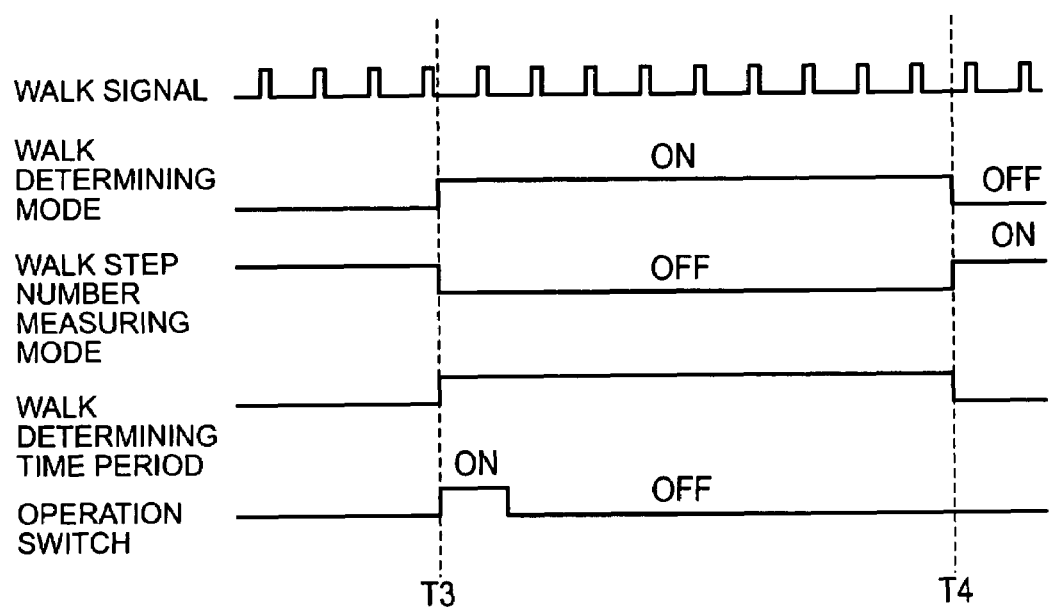
FIG. 5 is a timing chart of the pedometer according to the embodiment of the invention.

Further, FIG. 5 is a timing chart when the processing of FIG. 4 is carried out.

An explanation will be given of the walk step number measuring processing including the erroneous detection preventing processing in reference to FIG. 1, FIG. 4 and FIG. 5 as follows.

At time T3 of FIG. 5, when an operation of switching to display the display portion 107 or the like is carried out by the operating portion 104 (that is, an operation switch, not illustrated, is made ON by operating the operating portion 104 to initiate switching of the display mode), CPU 101 determines that the operating portion 104 is operated (step S311 of FIG. 4) and clears the walk step number data stored to the walk step number buffer memory 110 (step S312).

Further, CPU 101 forcibly stops the walk step number measuring mode by making the step number measuring mode OFF (step S313), and proceeds to the walk determining mode by making the walk determining mode ON (step S314). Here, the processing step S311 in CPU 101 constitutes the operation detecting means.

At and after the processing step 314, CPU 101 is brought into the walk determining mode and the walk step number measuring mode to carry out the walk step number measuring processing by carrying out the processings similar to those of FIG. 2 (steps S21 through S30, S210, S211).

In this way, CPU 101 stops walk step number measuring mode to proceed to the walk determining mode in response to the operation of the operating portion 104, however, when the user is walking, after elapse of the walk determining time period (time T3 through T4), CPU 101 continues to measure the walk step number by being shifted to the walk step number measuring mode again.

Therefore, although when the operating portion 104 is operated in a state of stopping the walk, CPU 101 determines that the walk is stopped and does not measure the walk step number, when the operating portion 104 is operated in the walking state, CPU 101 determines the walking to continue to measure the walk step number.

As described above, according to the pedometer according to the embodiment, when the operation of the operating portion 104 is detected, CPU 101 is shifted to the walk determining mode, counts the walk signal from the acceleration sensor 105 to successively store to the walk step number buffer memory 110 during the walk determining mode time period. On the other hand, when CPU 101 determines that the user is walking in the walk determining mode, CPU 101 is shifted to the walk step number measuring mode, adds the walk step number stored to the walk step number buffer memory 110 to the walk step number stored to the walk step number memory 109, thereafter, continuously measures the walk step number, and adds the walk signal to the walk step number of the walk step number memory 109 at each time of receiving the walk signal from the acceleration sensor 105. Further, in the walk determining mode, when it is determined to be brought into the walk stop state, the walk step number of the walk step number buffer memory 110 is not added to the walk step number of the walk step number memory 109 and the walk step number is stopped to be measured.

Therefore, the operation of the operating portion 104 can be restrained from being erroneously detected as the walk to achieve an effect of more accurately measuring the walk step number.

Further, the actual walk signal is always detected without carrying out the correction, and therefore, there is achieved an effect of accurately measuring the walk step number.

For example, when the display portion 107 is a liquid crystal display apparatus having a backlight, at night time or the like, even when the operating portion 104 is operated for switching on the backlight, or the operating portion 104 is operated for switching the display of the walk step number display mode, the distance display mode or the calorie display mode or the like, erroneous detection of the walk can be restrained.

The invention is applicable to various pedometers having operating portions of a pedometer of a type of being used by being mounted to the arm, a pedometer of a type of being used by being mounted to the waist, a pedometer of a type of being used in a state of being contained to be held in a bag and the like.

What is claimed is:

1. A pedometer comprising:
   walk detecting means for detecting a walk of a person and outputting a corresponding walk signal;
   walk step number counting means having a walk determining mode for determining whether the person is in a walk state or a walk stop state, and a walk step number measuring mode for calculating a walk step number continuously when the person is determined to be in the walk state in the walk determining mode, and stopping to count the walk step number when the person is determined to be in the walk stop state in the walk determining mode;
   displaying means for displaying the walk step number counted by the walk step number counting means;
   operating means operated by the person using the pedometer for initiating a predetermined pedometer operation; and
   operation detecting means for detecting the operation of the operating means;
   wherein the walk step number counting means shifts to the walk determining mode when it is detected that the operating means is operated by the operation detecting means, and counts the walk step number continuously by being shifted to the walk step number counting mode when the person is determined to be in the walk state in the walk determining mode.

2. The pedometer according to claim 1; wherein the walk step number counting means determines the walk state when the walk signal is provided continuously for a predetermined time period in the walk determining mode.

3. The pedometer according to claim 2; further comprising a walk step number buffer memory for successively storing the walk step number counted by the walk step number counting means in the walk determining mode, and a walk step number memory for successively storing the walk step number counted in the walk step number measuring mode;

wherein the walk step number counting means stores the walk step number counted in the walk determining mode to the walk step number buffer memory and stores the walk step number counted in the walk step number measuring mode to the walk step number memory, and adds the walk step number stored to the walk step number buffer memory to the walk step number stored to the walk step number memory in shifting from the walk determining mode to the walk step number measuring mode.

4. The pedometer according to claim 3; wherein the displaying means has a plurality of display modes including a walk step number display mode for displaying the walk step, and switches the display mode in response to the operation of the operating means.

5. The pedometer according to claim 4; wherein the displaying means displays the walk step number in correspondence with the walk step number stored to the walk step number memory in the walk step number display mode.

6. The pedometer according to claim 2; wherein the displaying means has a plurality of display modes including a walk step number display mode for displaying the walk step, and switches the display mode in response to the operation of the operating means.

7. The pedometer according to claim 6; wherein the displaying means displays the walk step number in correspondence with the walk step number stored to the walk step number memory in the walk step number display mode.

8. The pedometer according to claim 1; further comprising a walk step number buffer memory for successively storing the walk step number counted by the walk step number counting means in the walk determining mode, and a walk step number memory for successively storing the walk step number counted in the walk step number measuring mode;

wherein the walk step number counting means stores the walk step number counted in the walk determining mode to the walk step number buffer memory and stores the walk step number counted in the walk step number measuring mode to the walk step number memory, and adds the walk step number stored to the walk step number buffer memory to the walk step number stored to the walk step number memory in shifting from the walk determining mode to the walk step number measuring mode.

9. The pedometer according to claim 8; wherein the displaying means has a plurality of display modes including a walk step number display mode for displaying the walk step, and switches the display mode in response to the operation of the operating means.

10. The pedometer according to claim 9; wherein the displaying means displays the walk step number in correspondence with the walk step number stored to the walk step number memory in the walk step number display mode.

11. The pedometer according to claim 1; wherein the displaying means has a plurality of display modes including a walk step number display mode for displaying the walk step, and switches the display mode in response to the operation of the operating means.

12. The pedometer according to claim 11; wherein the displaying means displays the walk step number in correspondence with the walk step number stored to the walk step number memory in the walk step number display mode.

* * * * *